US012194676B1

(12) United States Patent
Yin et al.

(10) Patent No.: US 12,194,676 B1
(45) Date of Patent: Jan. 14, 2025

(54) MULTI-CELL DIGITAL LIGHT PROCESSING PRINTER AND PRINTING METHOD CONTROLLED BY "LIGHT FIELD-MAGNETIC FIELD" COUPLING

(71) Applicant: ZHEJIANG UNIVERSITY, Zhejiang (CN)

(72) Inventors: Jun Yin, Zhejiang (CN); Xuejiao Ma, Zhejiang (CN); Huayong Yang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 18/614,734

(22) Filed: Mar. 24, 2024

Related U.S. Application Data

(63) Continuation of application No. PCT/CN2023/128319, filed on Oct. 31, 2023.

(30) Foreign Application Priority Data

Aug. 29, 2023 (CN) .......................... 202311098112.0

(51) Int. Cl.
*B29C 64/165* (2017.01)
*B29C 64/245* (2017.01)
(Continued)

(52) U.S. Cl.
CPC .......... *B29C 64/165* (2017.08); *B29C 64/245* (2017.08); *B29C 64/314* (2017.08);
(Continued)

(58) Field of Classification Search
CPC ... B29C 64/165; B29C 64/314; B29C 64/245; B29C 64/336; B33Y 10/00; B33Y 70/00; B29K 2995/0008; B29K 2995/0056
See application file for complete search history.

(56) References Cited

U.S. PATENT DOCUMENTS

| 11,559,943 B1 | 1/2023 | Nagar et al. |
| 2002/0054284 A1* | 5/2002 | de Jager ................ B82Y 10/00 |
| | | 250/548 |

(Continued)

FOREIGN PATENT DOCUMENTS

| CN | 104841020 | 8/2015 |
| CN | 107320779 | 11/2017 |

(Continued)

OTHER PUBLICATIONS

"International Search Report (Form PCT/ISA/210) of PCT/CN2023/128319," mailed on Dec. 19, 2023, with English translation thereof, pp. 1-7.

*Primary Examiner* — Nahida Sultana
(74) *Attorney, Agent, or Firm* — JCIPRNET (57) ABSTRACT

The invention discloses a multi-cell digital light processing printer and method controlled by "light field-magnetic field" coupling. The invention couples a magnetic field generating device and a light curing device, and uses the magnetic field to control the material changing of microspheres carrying different cells and different magnetic contents in the vat, so that the material changing process and the printing process are in parallel, and the printing efficiency is improved; at the same time, a single vat is used for non-contact material changing, which reduces cross-contamination and can produce multi-cell biological structures with "high accuracy, high efficiency, and high cell activity".

3 Claims, 4 Drawing Sheets

(51) Int. Cl.
*B29C 64/314* (2017.01)
*B29C 64/336* (2017.01)
*B33Y 10/00* (2015.01)
*B33Y 70/00* (2020.01)

(52) U.S. Cl.
CPC ............ *B29C 64/336* (2017.08); *B33Y 10/00* (2014.12); *B29K 2995/0008* (2013.01); *B29K 2995/0056* (2013.01); *B33Y 70/00* (2014.12)

(56) References Cited

U.S. PATENT DOCUMENTS

| | | | |
|---|---|---|---|
| 2020/0408616 A1* | 12/2020 | Berkland | B29C 64/106 |
| 2023/0271383 A1* | 8/2023 | Ruzycki | B29C 64/245 |
| | | | 264/401 |
| 2023/0399597 A1* | 12/2023 | Schäfer | A61L 27/507 |
| 2024/0092026 A1* | 3/2024 | Baumann | B33Y 50/02 |

FOREIGN PATENT DOCUMENTS

| | | |
|---|---|---|
| CN | 111471140 | 7/2020 |
| CN | 114523780 | 5/2022 |
| JP | 2019171605 | 10/2019 |

\* cited by examiner

MULTI-CELL DIGITAL LIGHT PROCESSING PRINTER AND PRINTING METHOD CONTROLLED BY "LIGHT FIELD-MAGNETIC FIELD" COUPLING

CROSS-REFERENCE TO RELATED APPLICATION

This application is a continuation of international application of PCT application serial no. PCT/CN2023/128319, filed on Oct. 31, 2023, which claims the priority benefit of China application no. 202311098112.0, filed on Aug. 29, 2023. The entirety of each of the above mentioned patent applications is hereby incorporated by reference herein and made a part of this specification.

BACKGROUND

Technical Field

The invention belongs to a light curing printer in the field of biological 3D printing and digital light processing, and specifically relates to a multi-cell digital light processing printing system and a printing method based on the control of "light field-magnetic field" coupling.

Description of Related Art

DLP (digital light procession) stands for "Digital Light Procession" technology, which is a printing control method in the field of additive manufacturing technology. In order to replicate the biological environment of native tissues and realize biological functions thereof, multi-cell bioprinting is an inevitable requirement for manufacturing complex tissues and organs and is the future development direction of 3D bioprinting. The technologies implemented include, for example, extrusion printing, inkjet printing, and light curing printing, in which light curing printing has the advantages of high forming accuracy, fast forming speed, and easy model construction.

The conventional multi-cell digital light processing printing process uses methods such as manual material changing, multi-vat material changing, and microfluidic material changing to achieve multi-material printing, but high-accuracy three-dimensional forming and high-efficiency multi-cell printing of ultra-flexible cell-carrying bio ink still cannot be achieved, which has the following main problems:
1) The material changing and printing processes are serial, and the material changing efficiency is low.
2) There is cross-contamination and poor biological activity in multi-vat material changing.

In response to the above problems, the material changing process is paralleled with the printing process to improve printing efficiency; at the same time, non-contact single-vat material changing is used to reduce cross-contamination. External physical field assistance is an appropriate way. In previous research of external physical field assistance, magnetic fields and electric fields may only control magnetic particles or polar electronically controlled polymers for printing heterogeneous or reinforced structures. The sound field cannot control particles to move arbitrarily in a plane, and the light field can only manipulate small particles. In comparison, magnetic field assistance is a good choice, but there are still several problems in realizing multi-cell bioprinting:
1) Cells cannot be directly magnetically controlled.
2) Existing DLP equipment cannot be magnetically controlled.
3) The material changing and printing processes need to be coordinated in parallel.

SUMMARY

In order to solve the problems existing in the background technology, the present invention mainly proposes a multi-cell digital light processing printing process controlled by "light field-magnetic field" coupling, in which cells are prepared in magnetic microspheres, by introducing magnetic field assistance, the attraction of the magnetic field to the magnetic particles is used to control the movement of the cell-containing magnetic microspheres through the magnetic field, so that the cells reach the designated position to complete printing, realizing the material changing process and the printing process in parallel, and improving the printing efficiency; at the same time, a single vat is used for non-contact material changing to reduce cross-contamination; a new biomanufacturing process of "high accuracy-high efficiency-high cell activity" based on a single vat is realized, providing a new method for the biomanufacturing of heterogeneous tissues/organs.

In order to achieve the above purposes, the present invention includes the following technical solutions:
1. A multi-cell digital light processing printer controlled by "light field-magnetic field" coupling The multi-cell digital light processing printer includes a magnetic field generating device and a light curing device, the magnetic field generating device is used to generate a magnetic field to control aggregation and dispersion of corresponding magnetic microspheres carrying different cells, so that target cells move to a target printing position, and the light curing device is used to control bio ink containing the target cells to solidify and form at the target printing position.

The magnetic field generating device includes a power supply and a multi-pole electromagnet, the multi-pole electromagnet is disposed in the light curing device, and the multi-pole electromagnet is connected to the power supply.

The light curing device includes a UV projector, a stepper motor, a Z-axis screw rod, a printing platform, and a vat.

The vat is movably installed on the UV projector, the printing platform is disposed above the vat, the magnetic field generating device is arranged external to the vat, the printing platform is connected to the Z-axis screw rod, the stepper motor is fixedly and coaxially connected to the Z-axis screw rod, a curing end of the printing platform is vertically aligned with a center of the vat, the vat is used to place the bio ink, and the stepper motor controls the Z-axis screw rod to rotate to drive the printing platform to move up and down along the Z-axis screw rod.

The multi-pole electromagnet includes a plurality of single pole electromagnets arranged at intervals along a circumference, and each single pole electromagnet includes an iron core, a metal frame, and a coil; and an end of the iron core is set in a tapered shape and is marked as the tapered end, the tapered end of the iron core is set on an inner side, the metal frame is coaxially sleeved on the iron core except for the tapered end, the metal frame includes at least two annular blocks, multiple annular blocks are coaxially sleeved on the iron core at intervals sequentially, the coil is wound around outside of an outer circumference of the iron core between two adjacent annular blocks, and an outer diameter of the coil increases sequentially from an inner end to an outer end of each single pole electromagnet.

The multi-pole electromagnet includes at least four single pole electromagnets.

The metal frame is an aluminum frame.

The bio ink contains at least one type of cells, and each type of cells are carried in microspheres with corresponding magnetic contents.

2. A multi-cell digital light processing printing method controlled by "light field-magnetic field" coupling
   1) Microspheres carrying different cells and different magnetic contents are configured in bio ink, and then the bio ink is dropped into the vat.
   2) A target pattern of each printing layer is determined according to a multi-material printing model. A distance between the multi-pole electromagnet, the UV projector, and the vat is adjusted before printing so that a light curing printing plane P1 of the vat coincides with an optimal magnetic field action plane P2 of the vat in a gradient rotating magnetic field.
   3) A corresponding target gradient rotating magnetic field is generated to in each printing layer at each printing position corresponding to the target pattern by controlling the multi-pole electromagnet in the magnetic field generating device. The target gradient rotating magnetic field drives the microspheres carrying different magnetic contents and different cells in the vat to aggregate or disperse to obtain the target cells at the current printing position. At the same time, the printing platform is driven down, the UV projector projects to solidify the target cells at the current printing position to achieve in-layer material changing and printing in parallel. After curing is completed, 4) is performed.
   4) The printing position is changed, the printing platform is lifted, and 3) is repeated at the same time to solidify the corresponding target cells at different printing positions in the current printing layer until the current printing layer is completed.
   5) In this operation, 3) to 4) are repeated to perform printing to the remaining printing layers until the target three-dimensional structure is obtained.

The target cells at the current printing position include that cells do not exist at the current printing position.

In the above 3), according to the magnetic contents in different microspheres, the frequency and amplitude of the sinusoidal half-wave current transmitted from the power supply to the multi-pole electromagnet are adjusted, which controls the rotation frequency and field strength of the gradient rotating magnetic field, thereby the aggregation or dispersion of microspheres carrying different cells and different magnetic contents are controlled, so that the target cells reach the target printing position.

Compared with the existing art, the present invention has the following beneficial effects:

1. The present invention uses cell microspheres as the printing unit, and the printing accuracy is controlled by the size of the microspheres (~50 μm). At the same time, a plane is used as the forming unit. Compared with extrusion and inkjet printing, the forming accuracy is high and the forming speed is fast.

2. The present invention uses magnetic field assistance to realize material changing in a single vat. At the same time, the material changing process and the printing process are in parallel. Compared with conventional multi-material light curing printing with, for example, multi-vat and sequential injection, the cross-contamination is reduced, and the printing efficiency is improved.

3. The present invention uses a variety of cell microspheres for printing, which can realize the simultaneous construction of multi-cell tissues in a single printing process, and cells are arbitrarily distributed in a three-dimensional space.

In the drawings: 101. Power supply; 102. Multi-pole electromagnet; 201. UV projector; 202. Stepper motor; 203. Z-axis screw rod; 204. Printing platform; 205. Vat; 301. Iron core; 302. Metal frame; 303. Coil.

DESCRIPTION OF THE EMBODIMENTS

In order to make clear of, for example, the technology, the purpose of equipment, and the beneficial effects of the present invention, the equipment and technology of the present invention are further described below together with the embodiments and drawings.

Together with specific implementation manners and the accompanying drawings, the specific equipment and steps for implementing the method are described in detail below.

The multi-cell light curing printer includes a magnetic field generating device and a light curing device. The magnetic field generating device is used to generate a magnetic field to control the aggregation and dispersion of microspheres containing different cells and different magnetic contents, so that the target cells move to the target printing position; the light curing device is used to control the bio ink containing target cells to solidify and form at the target printing position, that is, to solidify the bio ink and print a three-dimensional structure layer by layer, and fix the cells in a specific distribution in the three-dimensional structure.

Figure 1:
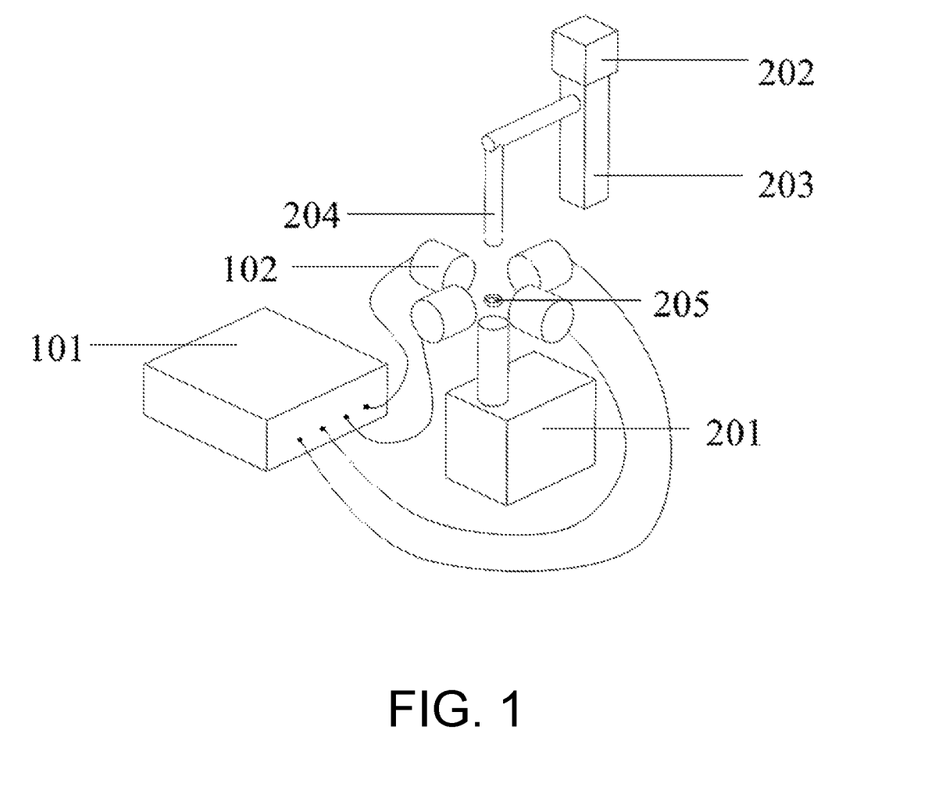
FIG. 1 is a schematic structural diagram of a multi-cell continuous digital light processing printing system controlled by "light field-magnetic field" coupling in the present invention.

As shown in FIG. 1, the magnetic field generating device includes a power supply 101 and a multi-pole electromagnet 102. The multi-pole electromagnet 102 is arranged between the UV projector 201 and the printing platform 204 of the light curing device. The vat 205 is arranged on the multi-pole electromagnet 102, in which the multi-pole electromagnet 102 is connected to the power supply 101. The multi-pole electromagnet 102 is used to realize multi-cell material changing in a single vat, and aggregate the target cells to the center of the vat.

The light curing device includes a UV projector 201, a stepper motor 202, a Z-axis screw rod 203, a printing platform 204, and a vat 205.

The vat 205 is movably installed on the UV projector 201, and the UV projector 201 is used to project patterns upward. The printing platform 204 is disposed above the vat 205. The multi-pole electromagnet 102 of the magnetic field generating device is arranged external to the vat 205. The vat 205 is located at the center of a xy plane where the multi-pole electromagnet 102 is located. The vat 205 may move up and down in a z-axis direction, the printing platform 204 is connected to the Z-axis screw rod 203 through a sliding block. The stepper motor 202 is fixedly and coaxially connected to the Z-axis screw rod 203. The curing end of the printing platform 204 is vertically aligned with the center of the vat. The vat 205 is used to place the bio ink, and the UV projector 201 and the stepper motor 202 are both connected to corresponding power supplies. The stepper motor 202 controls the Z-axis screw rod 203 to rotate to drive the printing platform 204 to move up and down along the Z-axis screw rod 203.

The UV projector 201 projects the pattern upward to solidify the material in the vat 205. The distance between the vat 205 and the lens of the UV projector 201 may be adjusted through the leveling mechanism to adjust the printing accuracy. When the distance between the bottom surface of the vat 205 and the lens of the UV projector 201 is a focal length f of the UV projector, the accuracy is high. At this time, the plane where the vat 205 is at is a light curing printing plane P1; the UV projector 201 and the vat 205 may move up and down in the magnetic field to find the magnetic field plane with the best aggregation and dispersion effects, which is marked as an optimal magnetic field action plane P2. The light curing printing plane P1 is coincided with the optimal magnetic field action plane P2; the Z-axis screw rod 203 is fixed on the optical platform through the gantry, and the printing platform 204 is connected and fixed on the Z-axis screw rod through a sliding block. Connected through a right-angle connector and vertically aligned with the center of the vat, it is ensured that movement of the printing platform 204 in the Z-axis direction does not collide with the magnetic field generating device during printing. The entire mechanism is controlled by the host computer, which controls the stepper motor 202 to drive the Z-axis screw rod 203 to drive the printing platform 204 up and down. The stepper motor and the UV projector receive signals from the host computer. After the target cells reach the designated position, the stepper motor controls the Z-axis screw rod to rotate. The printing platform drops to the printing height, the UV projector projects the pattern to solidify the bio ink after the printing platform is in place, and the target cells are fixed at the designated position. After solidification, the printing platform is lifted.

Figure 3:
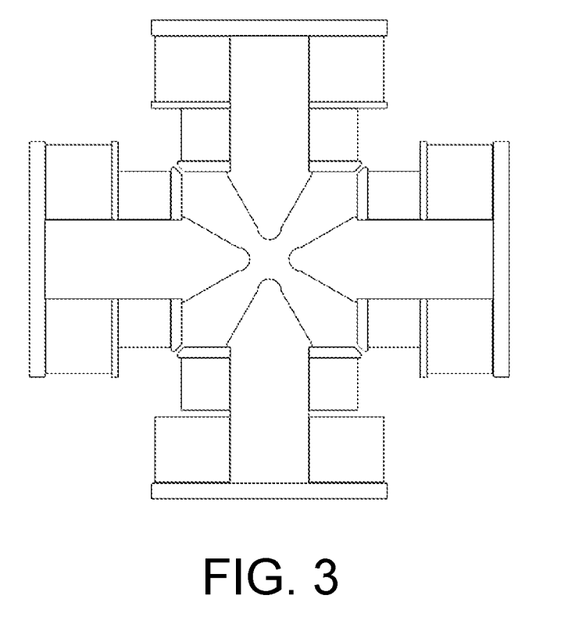
FIG. 3 is a schematic structural diagram of a multi-pole electromagnet.
Figure 4:
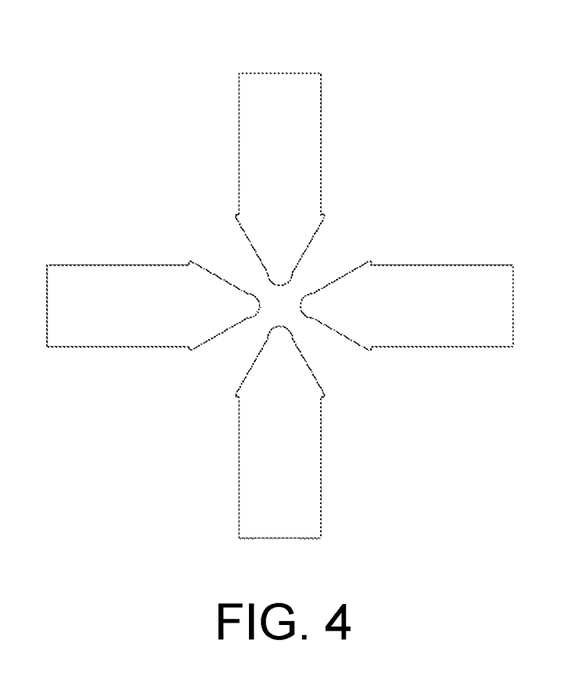
FIG. 4 is a schematic structural diagram of an iron core of the multi-pole electromagnet.
Figure 5:
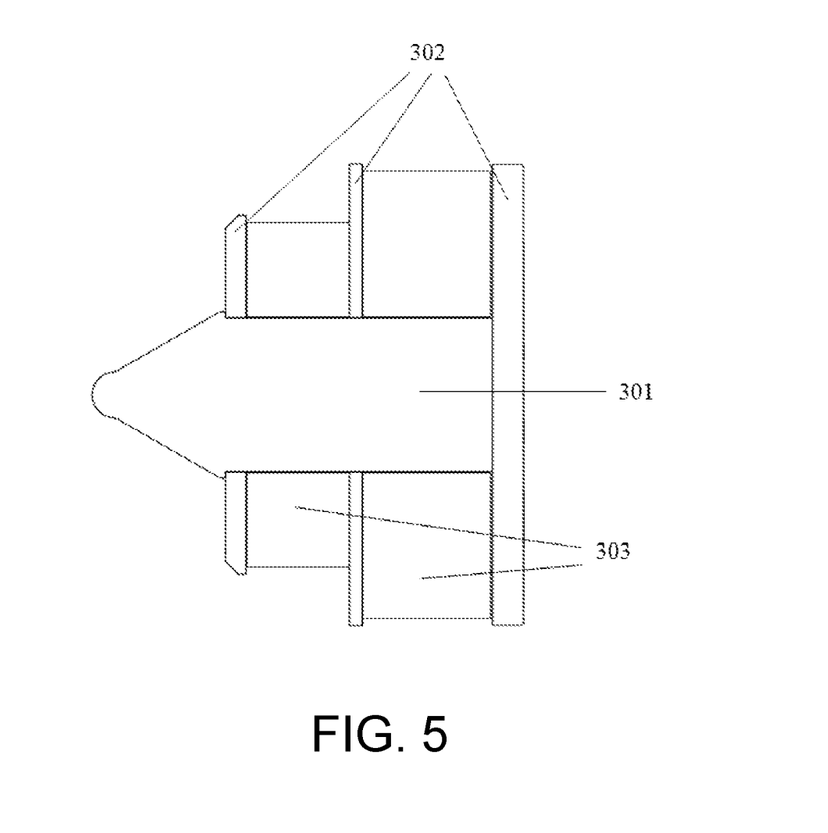
FIG. 5 is a schematic structural diagram of a single pole electromagnet.

As shown in FIG. 3, FIG. 4, and FIG. 5, the multi-pole electromagnet 102 comprises a plurality of single pole electromagnets arranged at equal intervals along the circumference. Each single pole electromagnet includes an iron core 301, a metal frame 302, and a coil 303; in this embodiment, the metal frame 302 is an aluminum frame. An end of the iron core 301 is set in a tapered shape and is marked as the tapered end. The iron core 301 is arranged in the radial direction, and the tapered end of the iron core 301 is arranged on an inner side. The tapered ends of the iron core 301 among the plurality of single pole electromagnets are arranged at intervals, and the metal frame 302 is coaxially sleeved on the iron core 301 except for the tapered end. The metal frame 302 includes at least two annular blocks. From the inner end to the outer end of each single pole electromagnet, multiple annular blocks are coaxially sleeved on the iron core 301 at intervals sequentially and are fixed and coaxially connected to the iron core 301. The coil 303 is wound around the outer circumference of the iron core 301 between two adjacent annular blocks. From the inner end to the outer end of each single pole electromagnet, the outer diameter of the coil 303 increases sequentially. The iron core comprising the tapered end can concentrate the magnetic field well, generating a large magnetic field gradient in the central part, and the metal frame does not affect the magnetic field distribution. The external power supply 101 supplies power to the multi-pole electromagnet 102 to excite the target magnetic field, and the specific signals thereof are controlled by the host computer and are respectively connected to the multi-pole electromagnet 102, in conjunction with the light curing printing process, the output frequency $f_{HZ}$ and amplitude $I_0$ of the four-channel sinusoidal half-wave current signal are switched to generate gradient rotating magnetic fields of different frequencies and different magnetic field strengths to be used for aggregation or dispersion of cell microspheres.

The multi-pole electromagnet 102 includes at least four single pole electromagnets.

In a specific implementation, the multi-pole electromagnet 102 adopts a four-pole electromagnet. The coil in each single pole electromagnet may allow a maximum current of 10 A to pass and an average resistance is 2.3Ω. When the maximum current flows through any one pole of the electromagnet, the center of the multi-pole electromagnet 102 may generate a magnetic field with a field strength of 150 mT and a gradient of 27.5 mT/m at maximum.

The bio ink contains at least one type of cells, and each type of cells is carried in microspheres with corresponding magnetic contents. Generally, different types of cell microspheres have different magnetic contents, and the microspheres may not contain cells.

A multi-cell light curing printing method controlled by "light field-magnetic field" coupling, the method includes the following steps.
1) Cell microspheres carrying different magnetic contents are configured in the bio ink, and then the bio ink is dropped into the vat 205.
2) A target pattern of each printing layer is determined according to a multi-material printing model, and the target pattern of each printing layer is projected to the vat 205 through the UV projector 201. In a specific implementation, a desired multi-material printing model is designed using a 3D software on the computer, a parameter file describing the model structure is generated according to the materials, and slicing patterns and printing codes are generated through the light curing printing software. Before printing, the distance between the multi-pole electromagnet 102, the UV projector 201, and the vat 205 is adjusted so that the light curing printing plane P1 of the vat 205 coincides with the optimal magnetic field action plane P2 of the vat 205 in a gradient rotating magnetic field, in which the light curing printing plane is obtained through the focal length f of the lens of the UV projector, the optimal magnetic field action plane is obtained through experiments on the dispersion and aggregation of magnetic microspheres, and a magnetic field height H with the shortest aggregation and dispersion time of the magnetic microspheres is selected as the optimal magnetic field action plane.
3) A corresponding target gradient rotating magnetic field is generated in each printing layer at each printing position corresponding to the target pattern by changing the power supply signal to control the multi-pole electromagnet 102 in the magnetic field generating device. The target gradient rotating magnetic field drives the microspheres carrying different magnetic contents and different cells in the vat 205 to aggregate or disperse to obtain target cells at the current printing position. At the same time, the printing platform 204 is driven down, the UV projector 201 projects to solidify the target cells at the current printing position, so as to achieve in-layer material changing and printing in parallel. After curing is completed, 4) is performed.

The target cells at the current printing position include that cells do not exist at the current printing position, that is, merely bio ink without cells.

4) The printing position is changed, the printing platform 204 is lifted, and 3) is repeated at the same time to solidify the corresponding target cells at different printing positions in the current printing layer until the current printing layer is completed.

5) In this operation, 3) to 4) are repeated to perform printing to the remaining printing layers until the target three-dimensional structure is obtained.

The invention prints and exposes materials layer by layer to form, so that the aggregated cells are fixed in corresponding positions thereof sequentially, a multi-cell high-accuracy three-dimensional artificial tissue is established through the single-vat multi-cell digital light processing printing, and the desired printing model is formed.

In 3), according to magnetic contents in different cell microspheres, the host computer adjusts the frequency and amplitude of the sinusoidal half-wave current transmitted from the power supply 101 to the multi-pole electromagnet 102, thereby the rotation frequency and field strength of the gradient rotating magnetic field is controlled, and the aggregation or dispersion of cell microspheres carrying different magnetic contents is controlled, so that the target cells reach the target printing position.

Specifically, the magnetic field used in the present invention is controlled by a power supply and needs to match the magnetic responsiveness of the magnetically controlled microspheres carrying different cells, thereby the spatial position distribution of the magnetically controlled microspheres carrying cells is controlled, and the separation and high-accuracy positioning of various cells are achieved.

The rotation frequency and field strength distribution of the gradient magnetic field required to aggregate and disperse cell microspheres with different magnetic contents are determined through dispersion and aggregation experiments of the magnetic microsphere, and thus the required Frequency $f_{HZ}$ and amplitude $I_0$ of the sinusoidal half-wave current output by the power supply is determined. Specifically, magnetic microspheres with a single magnetic content are configured in the bio ink and added to the vat. Based on the current parameters obtained through simulation, the frequency and amplitude of the sinusoidal half-wave current are adjusted from 1 to 100 Hz and 0 to 10 A. The trend and speed of the movement the magnetic microspheres are observed, and the range of the parameters and time that allow the aggregation and dispersion of the microspheres under this magnetic content are recorded. Similarly, the ranges of the parameters and times that allow the aggregation and dispersion of the magnetic microspheres with different magnetic contents are measured. When two kinds of microspheres are mixed, current parameters that can distribute and disperse the two kinds of microspheres with the shortest dispersion time is selected as the corresponding control current.

In addition, in the preparation of microspheres, different cells are prepared into magnetically controlled microspheres with different magnetic responsiveness. Different cells may be controlled separately through the different response times to the magnetic field of the microspheres with different magnetic responsiveness, thereby the control of different cells is achieved, in which the magnetic responsiveness is controlled by the amount of magnetic particles added. The relationship between the magnetic susceptibility $\chi_m$ of microspheres with different magnetic responsiveness and the received magnetic field force $F_{mag}$ is:

$$F_{mag}=m\nabla B=\mu_0 V\chi_m H\nabla H$$

In the formula, m is the magnetic moment of magnetic particles, $\nabla B$ is the magnetic induction intensity, $\mu_0$ is the vacuum magnetic permeability, V is the volume of the magnetic particles, $\chi_m$ is the magnetic susceptibility of the particles, and H is the magnetic field intensity.

Applying the gradient rotating magnetic field measured in the above experiments to the material, the aggregation and dispersion of magnetic microspheres can be achieved by switching the magnetic field rotation frequency and magnetic field intensity distribution, in which microspheres with a large magnetic susceptibility $\chi_m$ aggregate and disperse fast, while microspheres with a small magnetic susceptibility aggregate and disperse slowly, and thus different magnetic microspheres carrying cells are distinguished accordingly.

At the same time, the microspheres also experience drag force in the flow field. Since the liquid moves laminarly relative to the sphere, the drag force $F_D$ on the particles may be described by Stokes' law:

$$F_D=3\pi\mu d_p v$$

In the formula, $\mu$ is the hydrodynamic viscosity, $d_p$ is the diameter of the microsphere, and v is the velocity of the microsphere relative to the fluid.

In an actual printing process, the "light field-magnetic field" collaborative printing, the process is planned as follows. The magnetic field controls the target microsphere to reach the designated position, the printing platform moves simultaneously to reach the printing height, and the UV projector projects to solidify. The printing platform is lifted, the magnetic field is switched and materials are changed, and the above process is repeated until the printing is completed.

The magnetic field switching time interval is accurately calculated and controlled through the dispersion time and aggregation time of the magnetic microspheres in the current vat, the dropping time of the printing platform, and the exposure time of the UV projector. The UV projector projection time interval is also calculated through the above parameters, and the exposure time is controlled by material properties. Thereby, the solidification of the bio ink and the spatial positioning of the cell microspheres are completed simultaneously.

Figure 2:
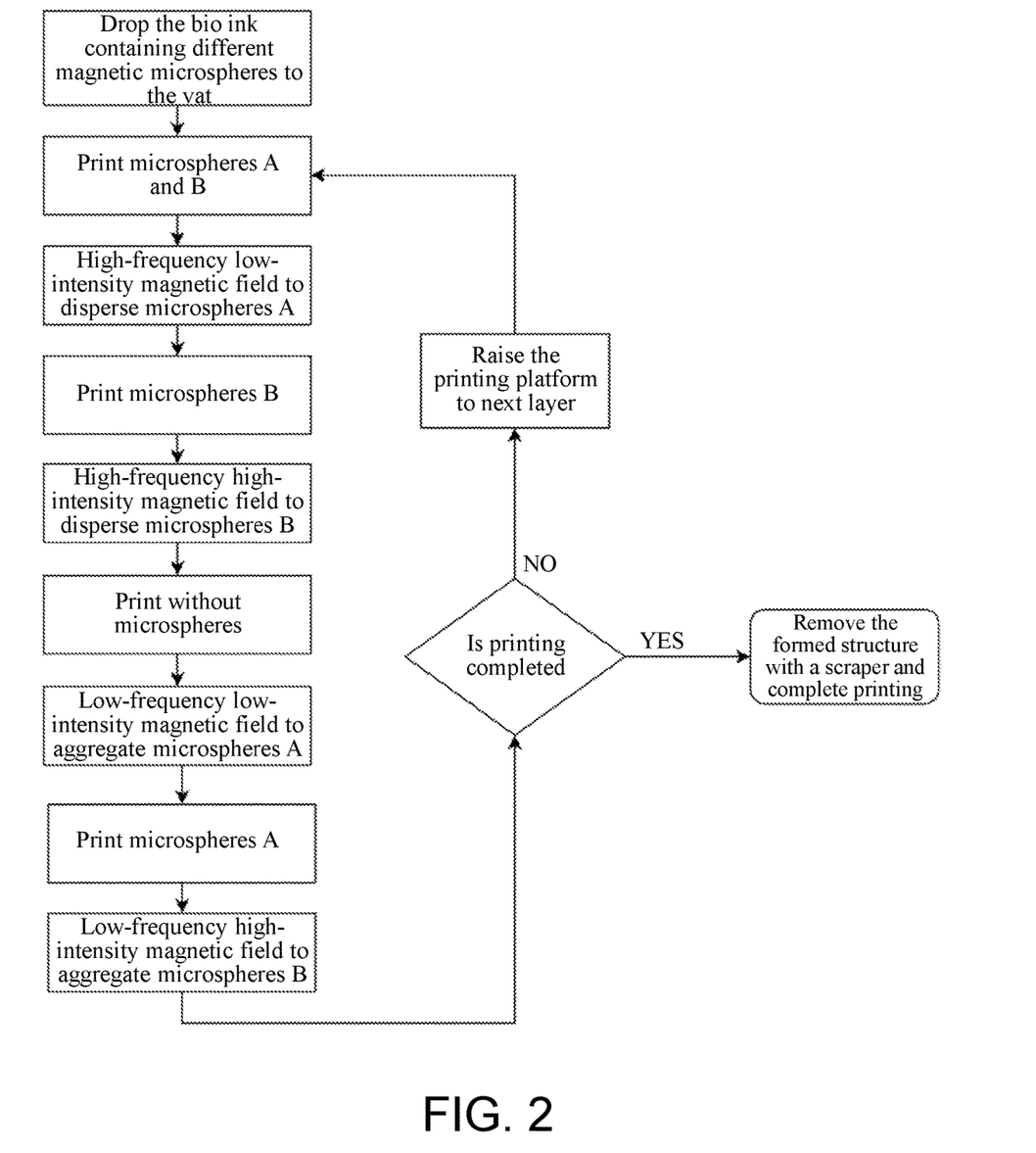
FIG. 2 is a flow chart of multi-cell bioprinting using the printing system proposed by the present invention.

Referring to FIG. 2, the present invention uses the above system to perform the multi-cell digital light processing printing controlled by "light field-magnetic field" coupling. The process is as follows, which may be divided into three stages.

The first stage is pre-processing. Taking GelMA bio ink as an example, two magnetic microspheres containing different cells are added to a 5% GelMA solution, mixed evenly, and then added to the vat 205 together, in which a microsphere A contains a cell A and has a magnetic content of 10%; a microsphere B contains a cell B and has a magnetic content of 1%. At the same time, it has been measured that, for the dispersion magnetic field of the microsphere A, the current parameters required are $I_{Adisperse}$, $f_{Adisperse}$, and the dispersion time required is $T_{LA}$; for the dispersion magnetic field of the microsphere B, the current parameters required are $I_{Bdisperse}$, $f_{Bdisperse}$, and the dispersion time required is $T_{LB}$; for the aggregation magnetic field of the microsphere A, the current parameters required are $I_{Aaggregate}$, $f_{Aaggregate}$, and the aggregation time required is $T_{2A}$; for the aggregation magnetic field of the microsphere B, the current parameters required are $I_{Baggregate}$, $f_{Baggregate}$, and the aggregation time required is $T_{2B}$; and the time required for the printing platform 204 to drop is $T_3$.

The second stage is printing. Each layer of printing may be divided into four steps, printing cell A, printing cell B, printing cells A and B simultaneously, and printing without cells. Each step may be divided into operations of three categories, magnetic field action, printing, and magnetic field switching.

In the first step, cells A and B are printed simultaneously. Initially, when the microspheres A and B are evenly dispersed in the solution, the printing platform 204 drops to a height of one layer. At the same time, the UV projector 201 projects to perform printing cells A and B simultaneously. After completion, the Z-axis screw rod 203 controls the printing platform 204 to rise.

In the second step, cells B are printed. The magnetic field action (specifically, a high-frequency magnetic field causes the magnetic microspheres to disperse, and a low-frequency magnetic field causes the magnetic microspheres to aggregate) is described as follows. The host computer controls the power supply 101 to sequentially pass a sinusoidal half-wave current with a phase difference of 90° to the four poles of the multi-pole electromagnet 102, and the current parameters thereof are $I_{Adisperse}$ and $f_{Adisperse}$. A high-frequency and low-intensity gradient rotating magnetic field is generated to control magnetic microspheres carrying cells A with large magnetic contents to disperse around fast, and merely microspheres carrying cells B are left in the vat 205. The printing is described as follows. The printing platform 204 starts to drop at a time ($T_{1A}$–$T_3$), and when the target cells are completed moving to the center, drops to the height of one layer. At this time, the UV projector 201 projects to perform printing cells B. After completion, the Z-axis screw rod 203 controls the printing platform 204 to rise.

In the third step, printing without cells is performed. The magnetic field switching is described as follows. The host computer controls the power supply 101 to sequentially pass the sinusoidal half-wave current with the phase difference of 90° to the four poles of the multi-pole electromagnet 102, and the current parameters thereof are switched to $I_{Bdisperse}$ and $f_{Bdisperse}$. The magnetic field effect is described as follows. A high-frequency and high-intensity gradient rotating magnetic field is generated by the multi-pole electromagnet 102 to control magnetic microspheres carrying cells B to disperse, and there are no microspheres in the vat. The printing is described as follows. The printing platform 204 starts to drop at a time ($T_{1B}$–$T_3$), and when dropping to the height of one layer, the UV projector 201 projects to perform printing without cells. After completion, the Z-axis screw rod 203 controls the printing platform 204 to rise.

In the fourth step, cells A are printed. The magnetic field switching is described as follows. The host computer controls the power supply 101 to sequentially pass the sinusoidal half-wave current with the phase difference of 90° to the four poles of the multi-pole electromagnet 102, and the current parameters thereof are switched to $I_{Aaggregate}$ and $f_{Aaggregate}$. The magnetic field effect is described as follows. A low-frequency and low-intensity gradient rotating magnetic field is generated by the multi-pole electromagnet 102 to control magnetic microspheres carrying cells A with large magnetic contents to aggregate fast toward the center, while the magnetic microspheres carrying cells B remain around the vat 205. The printing is described as follows. The printing platform 204 starts to drop at a time ($T_{2A}$–$T_3$), and when dropping to the height of one layer, the UV projector 201 projects to perform printing cells A. After completion, the Z-axis screw rod 203 controls the printing platform 204 to rise.

At this point, the structure printing of one layer is completed.

In a fifth step, cells are aggregated, and cells A and B are printed simultaneously. The magnetic field is described as follows. The host computer controls the power supply 101 to sequentially pass the sinusoidal half-wave current with the phase difference of 90° to the four poles of the multi-pole electromagnet 102, and the current parameters thereof are switched to $I_{Baggregate}$ and $f_{Baggregate}$. The magnetic field effect is described as follows. A low-frequency and high-intensity gradient rotating magnetic field is generated by the multi-pole electromagnet 102 to control magnetic microspheres of cells B to aggregate to the center of the vat 205. The printing is described as follows. The printing platform 204 starts to drop at a time ($T_{2B}$–$T_3$), and when dropping a height of two layers, the UV projector 201 projects to perform printing cells A and B simultaneously. After completion, the Z-axis screw rod 203 controls the printing platform 204 to rise.

The above second to fifth steps are repeated to complete the three-dimensional multi-cell bioprinting.

The third stage is post-processing. The printing platform 204 is removed from the Z-axis screw rod 203. The formed structure is removed using a scraper, stored in a PBS solution, soaked to remove dye as a light absorber, and may be placed on a glass slide to absorb water for observation.

The above description is merely a specific example of the present invention and does not constitute any limitation on the present invention.

When cells C are added to the solution, a non-contact single-vat printing of three types of cells may be completed simultaneously.

This invention couples the magnetic field and the light field for multi-cell light curing bioprinting, the material changing process and the printing process are planned in parallel, so that during multi-cell bioprinting, non-contact material changing in parallel can be achieved in a single vat, thereby the printing efficiency is improved, and cross-contamination is avoided. At the same time, cell microspheres are used as printing units, which can realize arbitrary arrangement of various cells in the three-dimensional space, and the multi-cell biological structure is manufactured with "high accuracy, high efficiency, and high cell activity".

What is claimed is:

1. A multi-cell digital light processing printing method controlled by light field-magnetic field coupling, wherein the printing method adopts the multi-cell digital light processing printer controlled by light field-magnetic field coupling,
    wherein the multi-cell digital light processing printer comprises a magnetic field generating device and a light curing device,
    wherein the magnetic field generating device is configured to generate a magnetic field to control aggregation and dispersion of corresponding magnetic microspheres carrying different cells, so that target cells move to a target printing position, and
    the light curing device is configured to control bio ink containing the target cells to solidify and form at the target printing position;
    wherein the magnetic field generating device comprises a power supply and a multi-pole electromagnet, the multi-pole electromagnet is disposed in the light curing device, and the multi-pole electromagnet is connected to the power supply;

wherein the light curing device comprises an UV projector, a stepper motor, a Z-axis screw rod, a printing platform, and a vat, and the vat is movably installed on the UV projector, the printing platform is disposed above the vat, the magnetic field generating device is arranged external to the vat, the printing platform is connected to the Z-axis screw rod, the stepper motor is fixedly and coaxially connected to the Z-axis screw rod, a curing end of the printing platform is vertically aligned with a center of the vat, the vat is configured to place the bio ink, and the stepper motor controls the Z-axis screw rod to rotate to drive the printing platform to move up and down along the Z-axis screw rod;

wherein the multi-pole electromagnet comprises a plurality of single pole electromagnets arranged at intervals along a circumference, each of the single pole electromagnets comprises an iron core, a metal frame, and a coil, an end of the iron core is set in a tapered shape and is marked as a tapered end, the tapered end of the iron core is set on an inner inside, the metal frame is coaxially sleeved on the iron core except for the tapered end, the metal frame comprises at least two annular blocks, the plurality of annular blocks are coaxially sleeved on the iron core at intervals sequentially, the coil is wound around outside of an outer circumference of the iron core between two adjacent annular blocks, and an outer diameter of the coil increases sequentially from an inner end to an outer end of each of the single pole electromagnets;

wherein the multi-pole electromagnet comprises at least four single pole electromagnets;

wherein the metal frame is an aluminum frame; or wherein the bio ink contains at least one type of cells, and each of the least one type of cells are carried in microspheres with corresponding magnetic contents, the printing method comprises steps as follows:

1) Configuring microspheres carrying different cells and different magnetic contents in the bio ink, and dropping the bio ink into the vat;

2) Determining a target pattern of each printing layer according to a multi-material printing model, adjusting a distance between the multi-pole electromagnet, the UV projector, and the vat so that a light curing printing plane of the vat coincides with an optimal magnetic field action plane of the vat in a gradient rotating magnetic field;

3) Generating a corresponding target gradient rotating magnetic field in each of the printing layers at each printing position corresponding to the target pattern by controlling the multi-pole electromagnet in the magnetic field generating device, driving the microspheres carrying the different magnetic contents and the different cells in the vat to aggregate or disperse by the target gradient rotating magnetic field to obtain target materials at a current printing position; and at the same time, driving the printing platform down, projecting by the UV projector to solidify the target materials at the current printing position to achieve in-layer material changing and printing in parallel, and performing 4) after curing is completed, wherein the target materials comprise magnetic microspheres with the different cells or the target materials comprise the magnetic microspheres with the different cells and cell-free magnetic microspheres;

4) Changing the printing position, lifting the printing platform, and repeating 3) at the same time to solidify corresponding target cells at different printing positions in a current printing layer until the current printing layer is completed; and 5) Repeating 3) to 4) and performing printing to remaining printing layers until a target three-dimensional structure is obtained.

2. The multi-cell digital light processing printing method controlled by light field-magnetic field coupling according to claim 1, wherein when the target materials at the current printing position comprise the magnetic microspheres with the different cells and the cell-free magnetic microspheres, multi-cell printing is capable of being conducted with the magnetic microspheres with the different cells and multi-material printing without the different cells is capable of being conducted with the cell-free magnetic microspheres.

3. The multi-cell digital light processing printing method controlled by light field-magnetic field coupling according to claim 1, wherein in the 3), a frequency and an amplitude of a sinusoidal half-wave current transmitted by the power supply to the multi-pole electromagnet are adjusted according to the magnetic contents in the different microspheres, which controls a rotation frequency and a field strength of the gradient rotating magnetic field, thereby aggregation or dispersion of the microspheres carrying the different cells and different magnetic contents are controlled, so that the target cells reach the target printing position.

* * * * *